United States Patent [19]

Peiffer et al.

[11] Patent Number: 4,739,834
[45] Date of Patent: Apr. 26, 1988

[54] CONTROLLED HYDRAULIC FRACTURING VIA NONAQUEOUS SOLUTIONS CONTAINING LOW CHARGE DENSITY POLYAMPHOLYTES

[75] Inventors: Dennis G. Peiffer, East Brunswick; Robert D. Lundberg, Bridgewater, both of N.J.; Lawrence P. Sedillo, Columbus, Ga.; John C. Newlove, Kingwood, Tex.

[73] Assignee: Exxon Research and Engineering Company, Florham Park, N.J.

[21] Appl. No.: 521

[22] Filed: Jan. 5, 1987

Related U.S. Application Data

[63] Continuation-in-part of Ser. No. 832,014, Feb. 24, 1986, abandoned, which is a continuation-in-part of Ser. No. 651,903, Sep. 19, 1984, abandoned.

[51] Int. Cl.$^4$ .............................................. E21B 43/26
[52] U.S. Cl. .................................. 166/308; 252/8.551
[58] Field of Search .......................... 252/8.514, 8.551; 166/280, 281, 308

[56] References Cited

U.S. PATENT DOCUMENTS

| | | | |
|---|---|---|---|
| 2,896,717 | 7/1959 | Howard | 166/281 |
| 3,749,174 | 7/1973 | Friedman et al. | 166/281 X |
| 3,836,511 | 9/1974 | O'Farrell et al. | 525/333 X |
| 3,845,822 | 11/1974 | Clampitt et al. | 166/281 |
| 3,846,310 | 11/1974 | Blackwell et al. | 252/8.551 |
| 4,282,130 | 8/1981 | Lundberg et al. | 524/389 X |
| 4,322,329 | 3/1982 | Lundberg et al. | 524/389 |
| 4,361,658 | 11/1982 | Lundberg et al. | 523/132 |
| 4,425,462 | 1/1984 | Turner et al. | 252/8.514 X |
| 4,442,011 | 4/1984 | Thaler et al. | 252/8.514 |

Primary Examiner—George A. Suchfield
Attorney, Agent, or Firm—Richard E. Nanfeldt

[57] ABSTRACT

A process for fracturing a subterranean formation surrounding a gas or oil well which comprises:

(a) injecting into said subterranean formation under hydraulic pressure a fluid comprising a solution of terpolymer dissolved in a solvent system, said solvent system comprising an organic liquid and a polar cosolvent, said polar cosolvent being less than about 15 weight percent of said solvent system, said terpolymer comprising a water-insoluble, oil-soluble terpolymer dissolved in said solvent system, the concentration of said terpolymer in said solution being about 0.2 to about 10 weight percent and the viscosity of said solution being less than about 2,000 cps, said terpolymer having the formula:

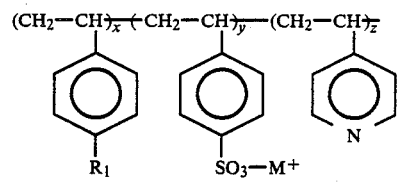

wherein $R_1 = C_6H_5$, $C_6H_4-CH_3$, $C_6H_4-(CH_3)_3$, $C_nH_2NH$; wherein $n = 1-30$; wherein x is about 50 to about 98 mole percent; y is about 1 to about 50 mole percent; z is about 1 to about 50 mole percent; wherein y and z are less than 60 mole percent; and M is an amine or a metal cation selected from the group consisting of antimony, tin, lead, Groups IA, IIA, IB and IIB of the Periodic Table of Elements; and (b) adding water to said solution of said polymer, said polar cosolvent transferring from said organic liquid to said water, thereby causing said organic liquid to gel within the fractures of said subterranean formation.

14 Claims, No Drawings

CONTROLLED HYDRAULIC FRACTURING VIA NONAQUEOUS SOLUTIONS CONTAINING LOW CHARGE DENSITY POLYAMPHOLYTES

This application is a continuation-in-part application of U.S. Ser. No. 832,014, filed Feb. 24, 1986, abandoned, which in turn is a continuation-in-part application of U.S. Ser. No. 651,903, filed Sept. 19, 1984, abandoned.

BACKGROUND OF THE INVENTION

1. Field of the Invention

The present invention relates to a process for the hydraulic fracturing of subterranean formations surrounding oil wells and gas wells by means of injection of a fracturing fluid into the well, wherein the fracturing fluid comprises a solution of non-polar organic liquid or oil, a polyampholyte and, possibly, a polar cosolvent and water.

2. Description of the Prior Art

Hydraulic fracturing has been widely used for stimulating the production of crude oil and natural gas from wells completed in low permeability reservoirs. The methods employed normally require the injection of a fracturing fluid containing a suspended propping agent into a well at a rate sufficient to open a fracture in the exposed formation. Continued pumping of fluid into the well at a high rate extends the fracture and leads to the buildup of a bed of propping agent particles between the fracture walls. These particles prevent complete closure of the fracture, as the fluid subsequently leaks off into the adjacent formation, and result in a permeable channel extending from the wellbore into the formation. The conductivity of this channel depends upon the fracture dimensions, the size of the propping agent particles, the particle spacing and the confining pressures. Studies of conventional fracturing operations indicate that fracture widths seldom exceed about one-fourth inch and that conductivities in excess of about 250,000 millidarcy-inches are rarely obtained. The average width and conductivity are considerably lower than these values.

With the advent of declining reserves, the drilling and stimulation of higher temperature wells in increasing the drilling and completion of light dry gas and water sensitive formation is also on the rise. The industry is relying to a greater extent on hydrocarbon fluids to drill and complete these wells which cannot be treated with the normal water-based fluids, therefore, there has been a substantial need for hydrocarbon-based viscosifiers which exhibit good performance at high temperatures.

A desirable formulation, both for drilling fluids and hydraulic fracturing fluids, would be a homogeneous fluid which possesses adequate viscosity of 30–1,000 cps-A non-polar, organic-liquid-based, fluid-containing polymer viscosifiers would meet the above-stated requirements.

Since the beginning of recorded oil well production hydrocarbon-based viscosifiers have played an important role in hydraulic fracturing fluids. Some of these viscosifiers have been either metal soaps of fatty acids, or metal soaps of partially esterified phosphates. Both of these impart viscosity to hydrocarbons, but the metal soaps of fatty acids have inherent thermal thinning properties, which give them limited utility at higher temperatures. The metal soaps of partially esterified phosphates have the disadvantage of being extremely pH sensitive, along with being thermally thinning.

So a viscosifier that has the advantage of maintaining viscosity at high temperatures and/or is not susceptible to variations in pH would represent an advancement over the prior art.

The instant invention differs from a number of applications, U.S. Ser. No. 223,482, U.S. Pat. No. 4,361,658; U.S. Ser. No. 136,837, U.S. Pat. No. 4,322,329, and U.S. Ser. No. 106,027, U.S. Pat. No. 4,282,130, filed by Robert D. Lundberg, one of the instant inventors, et al. These previously-filed applications were directed to the gelling of the organic liquid by a water insoluble, neutralized, sulfonated polymer, whereas the instant invention is directed to fracturing fluids formed from a non-polar, organic liquid and a polyampholyte.

In U.S. Ser. No. 547,955, filed Nov. 2, 1983, abandoned, two polymers are mixed to produce an interpolymer complex which at relatively low concentrations forms a three-dimensional network with a gel-like behavior. Interpolymer complexes are much more effective in forming a network than are single associating polymers, leading to gels of higher strength. The instant polyampholytes are not a polymeric complex as defined in U.S. Ser. No. 547,955.

In U.S. Ser. No. 547,955 the interpolymer complexes in hydrocarbon solutions are obtained by mixing two polymers which are strongly associated with each other. One polymer will contain anionic groups along or pendant to its backbone; and the other polymer will contain cationic groups. The coulombic interaction between cationic and anionic groups leads to network formation, if each chain contains interacting groups in multiple locations.

In the instant invention low charge density polyampholytes are formed in nonaqueous solutions by sulfonation of a preformed base-containing copolymer, such as styrene-4 vinylpyridine. In a polyampholyte the cationic and anionic moieties which are located on the same chain backbone, i.e., sulfonate and 4-vinylpyridine units, interact very strongly with each other. Therefore, these polyampholytes strongly interact with each other, forming a tight networks, i.e., gel, since each chain contains interacting groups in multiple locations. The gel structure, to a first approximation, more tightly bound than its low charge density sulfonate ionomer counterpart and, more importantly, the properties of these gels are improved over the interpolymer complexes. Even more importantly, these polyampholytic gel systems are formed without having to mix oppositely-charged copolymers, as taught in U.S. Ser. No. 547,955.

A solution of polyampholyte and a non-polar organic solvent will have a relatively high viscosity. This can be used as is, if the solution viscosity is not excessive, and, if excessive, the solution viscosity can be modified by the incremental addition of a variety of polar cosolvents, modifying the solution's rheological properties. If by the co-mining water with a solution of polyampholytes and a non-polar solvent, the polar cosolvent is extracted into the water phase, an increase in viscosity or gelling would result in the ampholyte solution during injection into a well. This viscous gel can then be used as a fracturing fluid.

SUMMARY OF THE INVENTION

The fracturing method of this invention is carried out by injecting a fracturing fluid through a sting of tubing or casing into a fracture. The fracturing fluid is composed of a non-polar organic liquid, a polar cosolvent and the polyampholyte. When water is mixed with the fracturing fluid, the polar cosolvent is extracted from the fracturing fluid into the water phase and the viscosity of the fracturing fluid will increase and a gel will be formed. The water can be added to the fracturing fluid prior to its injection into the fracture or the water is obtained from the naturally occuring water within the fracture itself. If the water is mixed with the fracturing fluid prior to injection into the casing mixing occurings during injection through the tubing. Injection of the high viscosity fluid is continued until a fracture of sufficient width to produce a highly conductive channel has been formed, wherein the gel which is formed is contained within the fracture and keeps the fracture open. The injected fluid is then permitted to leak off into the formation until the fracture has closed sufficiently to hold the gel in place and, if applicable, propellant and other materials are used, as desired. Thereafter, the fluid remaining in the fracture may be produced back into the wellbore.

Accordingly, it is a primary object of the instant invention to describe an economical fracturing process for fracturing a subterranean formation by means of a fracturing fluid which comprises a solution of non-polar organic liquid, a polar cosolvent and a polyampholyte.

GENERAL DESCRIPTION

The present invention relates to a process for the fracturing of a subterranean formation surrounding an oil well or gas well in order to increase the recovery of the oil or gas. The process includes the steps of forming a solvent system of a non-polar, organic liquid or oil and a polar cosolvent, the polar cosolvent being less than about 15 weight percent of the solvent system, the viscosity of solvent system being less than about 1,000 cps; dissolving a polyampholyte in the solvent system to form a solution; and injecting the solution in the well under hydraulic pressure to fracture the subterranean formation. The viscosity needed to accomplish this can be achieved in a number of ways:

1. The first method being the variation of ampholytic concentration of and/or ampholytic density to obtain a variety of rheological properties.
2. Certain polar cosolvents in incremental amounts can be added to the non-polar solvent-polyampholyte solution, modifying and controlling its rheological properties.
3. Certain polar cosolvents can be added to the non-polar solvent-polyampholyte solution, reducing its viscosity. This solution would then be pumped and co-mingled in surface tubular mixers with water, extracting the polar solvent from the polyampholyte solution, forming a gel of high viscosity.
4. A concentrate of the polyampholyte in the non-polar hydrocarbon solvent containing a polar cosolvent to render the solution of a low viscosity. This would then be co-mingled during pumping through tubular mixers, with additional non-polar solvent diluting the polyampholyte solution and forming a gel of high viscosity which in all cases may be used as fracturing fluid.

The gelled polymer solution, having a viscosity greater than 50 cps, acts as a propping means within the fractures of the subterranean formation. The gel is formed by the addition of water to the polymer solution, wherein the polymer solution comprises a water-insoluble, oil-soluble polyampholyte, a non-polar organic liquid and a polar cosolvent, wherein the the solution has a viscosity of less than 2,000 cps. The concentration of polyampholyte in the solution is 0.2 to 10 weight percent, more preferably about 0.3 to about 9, and most preferably about 0.4 to about 8. Upon the addition of water to the solution of the polyampholyte the polar cosolvent may, in one instance, transfer from the solution of the polyampholyte, non-polar organic liquid and the polar cosolvent to the aqueous phase, causing gelation of the non-polar organic liquid.

The component materials of the instant process generally include a water-insoluble, oil-soluble polyampholyte at a concentration level of 0.2 to 10 weight percent, more preferably about 0.3 to about 9.0, and most preferably about 0.2 to about 8.0, a non-polar organic liquid and a polar cosolvent to which water is subsequently added.

The polyampholytes of the instant invention are water-insoluble, oil-soluble terpolymers of a nonionic monomer, a sulfonate-containing monomer and an amine-containing monomer. The terpolymers of the instant invention are formed by a free radical emulsion polymerization of the amine-containing monomer and the nonionic monomer to form a copolymer of the nonionic monomer and the amine-containing monomer. This copolymer is subsequently sulfonated according to the procedures of U.S. Pat. No. 3,836,511, which is hereby incorporated by reference, to form the terpolymer of the nonionic monomer, the sulfonate-containing monomer and the amine-containing monomer.

Suitable oil-soluble and water-insoluble terpolymers of the instant invention generally have the formula:

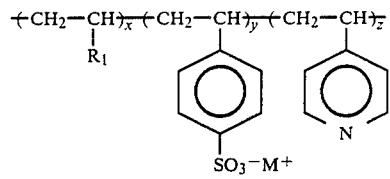

wherein $R_1 = C_6H_5$, $C_6H_4-CH_3$, $C_6H_4-(CH_3)_3$, $C_nH_2NH'$ wherein $n = 1-30$; wherein x is about 40 to about about 98 mole percent, more preferably about 50 to about 95 mole percent, and most preferably about 80 to about 90; y is about 1 to about 50 mole percent, more preferably about 2 to about 20 mole percent, and most preferably about 2 to about 10 mole percent; z is about 1 to about 50 mole percent, more preferably about 2 to about 20, and most preferably about 2 to about 10; wherein y and z are less than 60 mole percent; and M is an amine or a metal cation selected from the group consisting of antimony, aluminum, tin, lead, Groups IA, IIA, IVA, VII, VII, VIA, IB and IIB of the Periodic Table of Elements.

The molecular weight, as derived from intrinsic viscosities, for the terpolymers of styrene/metal styrene sulfonate/vinyl pyridine is about $1 \times 10^3$ to about $5 \times 10^7$, more preferably about $1 \times 10^4$ to about $2 \times 10^7$, and most preferably about $1 \times 10_5$ to about $1 \times 10^7$. The means for determining the molecular weights of the oil-soluble and water-insoluble terpolymers from the viscosity of the solutions of the terpolymers comprises the initial isolation of the hydrocarbon-soluble terpolymers, purification and redissolving the terpolymers in a nonaqueous solvent to give solutions with well known concentrations. The flow times of the solutions and the pure solvent were measured in a standard Ubbelhold viscometer. Subsequently the reduced viscosity is calculated through standard methods utilizing these values. Extrapolation to zero polymer concentration leads to the intrinsic viscosity of the polymer solution. The intrinsic viscosity is directly related to the molecular weight through the well known Mark Houwink relationship. Polymerization process is generally preferred, but other processes are also acceptable.

The vinyl pyridine content of the preferred copolymer of styrene and vinylpyridine is about 1 to about 50 mole percent, more preferably about 2 to about 20 mole percent, and most preferably about 2 to about 10 mole percent. The number average molecular weight, as measured by GPC, is about 10,000 to about 10,000,000, preferably about 20,000 to about 5,000,000, and most preferably about 30,000 to about 2,000,000.

The amine-containing polymer is typically a polymeric backbone where the nitrogen elements are in the chain or pendant to it. Such a polymer may be obtained by direct copolymerization of a monomer containing the basic moiety with other monomers, or by grafting a monomer containing the basic moiety on to a polymerized chain. Monomers can be chosen from vinyl monomers leading to hydrocarbon-soluble polymers, such as styrene, t-butyl styrene, acrylonitrile, isoprene, butadiene, acrylates, methacrylates and vinyl acetate. Monomers containing a basic moiety will be those which contain amine or alkyl amine groups, or pyridine groups, such as vinyl pyridine.

The amount of vinyl pyridine in the amine-containing copolymer can vary widely, but should range from about 0.01 mole percent to about 25 mole percent.

Preferably, the amine content in the amine-containing copolymer is expressed in terms of basic nitrogen. In this respect, the nitrogen content in amides and similar non-basic nitrogen functionality is not part of the interacting species.

A minimum of three basic groups must be present on the average per polymer molecule and the basic nitrogen content generally will range from 4 meq. per 100 grams of polymer up to 500 meq. per 100 grams. A range of 80 to 200 meq. per 100 grams is preferred.

The amine-containing copolymer of styrene and vinyl pyridine is sulfonated according to the procedures of U.S. Pat. No. 3,836,511, which is herein incorporated by reference, to form the terpolymer of styrene/styrene sulfonic acid/vinylpyridien, which is subsequently neutralized with an amine or metal cation to form the terpolymer of styrene/neutralized styrene sulfonate/vinylpyridine.

The number of sulfonate groups contained in the terpolymer is a critical parameter affecting this invention. The number of sulfonate groups present in the polymer can be described in a variety of ways, such as weight percent, mole percent, number per polymer chain, etc. For most polymer systems of interest in this invention it is desirable to employ mole percent. An alternate way of expressing this is to state the sulfonate level in terms of milliequivalents of sulfonic acid groups per 100 grams of polymer. This latter procedure provides a rapid and independent measure of sulfonic acid content in a polymer through simple titration.

Both mole percent sulfonate and meq. of sulfonate will be employed to describe the sulfonate polymers employed in this invention.

In general, the terpolymer will comprise from about 1 meq. up to 500 meq. of sulfonate groups per 100 grams of polymer, more preferably about 5 meq. to about 300 meq. of sulfonate groups, and most preferably about 10 to about 100. The unneutralized sulfonate terpolymers in the instant invention are neutralized with the basic materials selected from the group consisting of Groups IA, IIA, IVA, VIA, VIIA, VIIIA, IB and IIB of the Periodic Table of Elements and lead, aluminum, tin and antimony. A preferred counter-ion for this invention is zinc.

Neutralization of the unneutralized sulfonated terpolymers with appropriate metal hydroxides, metal acetates, metal oxides, etc. can be conducted by means well-known in the art. For example, the sulfonation process of the copolymer containing a small 0.3 to 1.0 mole percent unsaturation can be conducted in a suitable solvent, such as 1,2-dichloroethane with acetyl sulfate as the sulfonating agent. The resulting sulfonic acid derivative can then be neutralized with a number of different neutralization agents, such as sodium phenolate and similar metal salts. The amounts of such neutralization agents employed will normally be stoichiometrically equal or, in some cases, excess to the amount of free acid in the polymer, plus any reacted reagent which still is present. It is preferred that the amount of neutralizing agent be equal to the molar amount of sulfonating agent originally employed, plus 10% more to ensure full neutralization. The use of more of such neutralization agent is not critical. Sufficient neutralization agent is necessary to affect at least 50% neutralization of the sulfonic acid groups present in the polymer, preferably at least 90%, and most preferably essentially complete neutralization of such acid groups should be effected.

The degree of neutralization of said sulfonate groups may vary from 50 to 500 mole percent, preferably 90 to 200%. It is preferred that the degree of neutralization can be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralization material may be utilized without defeating the objects of the instant invention.

We have surprisingly found that a very important factor in determining the strength of the interaction between the sulfonate groups and amine-containing groups in the terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text, *Chemical Principles and Properties* by J. M. Sienko and R. A. Plane, McGraw Hill Book Company, 1974, page 19). These metal cations are best exemplified by zinc and interact strongly with pyridine and similar amines. As a consequence, a zinc neutralized sulfonate group interacts much more strongly with the vinylpyridine in the terpolymer than does a magnesium or sodium neutralized system. It is for this reason that the transition elements are preferred, with zinc, copper, titanium, firconium, chromium, iron, nickel and cobalt being especially preferred. We also include aluminum, antimony and lead as suitable cations.

A third species which is preferred is the free sulfonic acid of the terpolymer, which will also interact with the vinylpyridine. In this latter case, it is clear that the interaction is a classic acid-base interaction, while with the transition metals a true coordination complex is created, which is due to the donation of the electron pair of the nitrogen element. This distinction is a very important one and sets these polyampholytes apart from classic acid-base interactions. The surprising observation is that such coordination complexes can form in such extreme dilution insofar as interacting groups are concerned, and that they are apparently formed so far removed from their expected stoichiometry (based on small molecule analogs). Therefore, only those polymer backbones (i.e., as measured in the absence of ionic groups) having a solubility parameter less than 10.5 are suitable in this invention.

The organic liquids which may be utilized in the instant invention are selected with relation to the anionic and cationic moieties of the polyampholyte and vice versa. The organic liquid is selected from the group consisting of crude or refined paraffinic, naphthenic and aromatic hydrocarbons, cyclic aliphatic ethers, aliphatic ethers, or organic aliphatic esters and mixtures thereof.

The method of the instant invention includes incorporating a polar cosolvent, for example an alcohol, in the solution of the nonpolar organic liquid and a water-insoluble, oil-soluble polyampholyte in order to solubilize the pendant sulfonate groups. The polar cosolvent will in one case have a solubility parameter of at least 10.0, more preferably at least 11.0, and is water miscible. Additionally, the polar solvent will have a solubility parameter of about or less than 10 and is hydrocarbon miscible. The polar solvent comprises from 0.1 to 15.0 weight percent, more preferably 0.1 to 5.0 weight percent, of the total mixture of the non-polar organic liquid-water insoluble, oil-soluble polyampholyte and polar cosolvent. The viscosity of the solvent system measured at room temperature is less than about 1,000 cps, more preferably less than about 800 cps, and most preferably less than about 500 cps.

Normally, the polar cosolvent will be a liquid at room temperature, however, this is not a requirement. It is preferred, but not required, that the polar cosolvent be soluble or miscible with the organic liquid at the levels employed in this invention. The polar cosolvent is selected from the group consisting of soluble alcohols, amines, di- or tri-functional alcohols, amides, acetamides, phosphates or lactones and mixtures thereof. Especially preferred polar coslovents are aliphatic alcohols having about 1 to about 20 carbon atoms, such as methanol, ethanol, n-propanol, isopropanol, oleyl and 1,2-propane diol.

The amount of water added to the solution of water-insoluble, oil-soluble polyampholyte, organic liquid and polar cosolvent having a viscosity of less than about 2,000 cps is about 0.5 to about 500 volume percent of water, more preferably about 1.0 to about 300 volume percent water, most preferably about 2 to about 200 volume percent water.

The water can be added to the solution of the polyampholyte, organic liquid and polar cosolvent by one of three methods. In the first method the water is added to and mixed with the solution of the polyampholyte, organic liquid and polar cosolvent above ground and prior to pumping through the string of tubing or casing into the fracture. The second method comprises pumping the solution of the polyampholyte, organic liquid and polar cosolvent through the string of tubing or casing into the fracture and subsequently pumping water through the string of tubing or casing into the fracturing such that the water is added to the solution of the polyampholyte, organic liquid and polar cosolvent within the fracture. The third method comprises pumping the solution of the polyampholyte, the organic liquid and polar cosolvent through the string of tubing or casing into the fracture, wherein water contained naturally within the fracture or earth formation mixes with the solution of the polyampholyte, organic liquid and polar cosolvent.

DETAILED DESCRIPTION OF THE INVENTION

The following Examples illustrate the present invention without, however, limiting the same hereto.

EXAMPLE 1

A representative example for the synthesis of styrene-4-vinylpyridine copolymer, which is subsequently sulfonated, is described below.

Into a 1 liter, 4 neck flask was added:
50 grams styrene
3.2 grams sodium lauryl sulfate
120 ml distilled water
0.2 grams potassium persulfate
0.5 grams dodecylthiol
1.1 grams 4-vinylpyridine.

The solution was purged with nitrogen gas for 1 hour to remove dissolved oxygen. As the nitrogen gas purging began the solution was heated to 50° C. After 24 hours the polymer was precipitated from solution with a large excess of acetone. Subsequently, the polymer was washed with acetone and dried in a vacuum oven at 60° C. for 24 hours. Elemental analysis showed that the copolymer contained 2.5 mole percent 4-vinylpyridine.

EXAMPLE 2

A representative example for the sulfonation of the styrene-4-vinylpyridine copolymer is described below.

The following procedure was generally followed: 50 grams of the copolymer of styrene-4-vinyl-pyridine was dissolved in 500 ml of 1,2-dichloroethane. The solution was heated to 50° C., and the requisite amount of acetyl sulfate was added, in this case, 34.6 ml of 9.996M acetyl sulfate (24.5 meq.). The solution was stirred for 60 minutes at 50° C. and the reaction was terminated by the addition of 40 ml of methanol. Sufficient zinc acetate (diluted with methanol) was added to neutralize all acid present. The polymer solution was precipitated into a substantial excess of methanol with vigorous agitation, followed by filtration and washing with methanol. The product was then vacuum dried. Analyses were conducted for sulfur and sodium. The level of sulfonate incorporated was determined by sulfur analysis.

Elemental analysis shows that 1.6 mole percent sulfonate groups were incorporated into the polymer chain structure.

EXAMPLE 3

Presented in Tables I and II are representative data on the rheological properties of hydrocarbon soluble ampholyte polymer composed of approximately 35 mole percent t-butyl styrene, 60 mole percent styrene, 3 mole percent styrene sulfonate and 2 mole percent 4-vinylpyridine dissolved in xylene.

Subsequently, the samples were heated under constant shears and fann 50° C. rheometer at (170 sec$^{-1}$) and periodically the shear was reduced to (85 sec$^{-1}$) for rheological property measurement. The testing was completed by cooling the sample and measuring a final rheology. The viscosities yielded show that these hydrocarbon ampholytes are very effective at enhancing rheological properties of hydrocarbons with relatively good viscosity stability.

TABLE I

| | 1% w/w Ampholyte in Xylene | |
|---|---|---|
| | 1% w/w Oleyl Alcohol in Xylene | |
| Time (Minutes) | Temperature +(F.°) | Viscosity at 170 Sec$^{-1}$ |
| 0 | 75 | 23 |
| 15 | 150 | 19 |
| 30 | 150 | 19 |
| 60 | 150 | 19 |
| 90 | 75 | 22 |

TABLE II

| | 2% w/w Ampholyte in Xylene | |
|---|---|---|
| | 1% w/w Oleyl Alcohol in Xylene | |
| Time (Minutes) | Temperature +(F.°) | Viscosity at 170 Sec$^{-1}$ |
| 0 | 75 | 567 |
| 18 | 150 | 38 |
| 30 | 150 | 25 |
| 45 | 150 | 19 |
| 60 | 150 | 18 |
| 75 | 250 | 8 |
| 90 | 250 | 7 |
| 168 | 75 | 431 |

What is claimed is:

1. A process for fracturing a subterranean formation surrounding a gas or oil well which comprises:
   (a) injecting into fractures of said subterranean formation under hydraulic pressure a fluid comprising a solution of terpolymer dissolved in a solvent system, said solvent system comprising an organic liquid and a polar cosolvent, said polar cosolvent being less than about 15 weight percent of said solvent system, said terpolymer consisting of a water-insoluble, oil-soluble terpolymer dissolved in said solvent system, the concentration of said terpolymer in said solution being about 0.2 to about 10 weight percent and the viscosity of said solution being less than about 2,000 cps, said terpolymer having the formula:

$$-(CH_2-CH)_x-(CH_2-CH)_y-(CH_2-CH)_z-$$

with $R_1$ on the first unit, a phenyl ring with $SO_3^-M^+$ on the second unit, and a phenyl ring with $N$ on the third unit;

wherein $R_1 = C_6H_5$, $C_6H_4-CH_3$, $C_6H_4-(CH_3)_3$, $C_nH_2NH$; wherein $n = 1-30$; wherein x is about 50 to about 98 mole percent; Y is about 1 to about 50 mole percent; z is about 1 to about 50 mole percent; wherein Y and z are less than 60 mole percent; and M is an amine or a metal cation selected from the group consisting of antimony, tin, lead, Groups IA, IIA, IB and IIB of the Periodic Table of Elements; and
   (b) adding water to said solution of said polymer, said polar cosolvent transferring from said organic liquid to said water, thereby causing said organic liquid to gel within the fractures of said subterranean formation and said gel increasing the width of said fracture to form a highly conductive channel and said gel keeping said fracture open.

2. A process according to claim 1 wherein said terpolymer has about 10 to about 200 meq. of sulfonate groups per 100 grams of said terpolymer.

3. A process according to claim 2 wherein said sulfonate groups are neutralized with an ammonium or metal counterion.

4. A process according to claim 3 wherein said metal counterion is selected from the group consisting of antimony, tin, lead or Groups IA, IIA, IB and IIB of the Periodic Table of Elements.

5. A process according to claim 3 wherein said sulfonate groups are at least 90 mole percent neutralized.

6. A process according to claim 1 wherein said polar cosolvent has a greater polarity than said organic liquid.

7. A process according to claim 1 wherein said polar cosolvent is selected from the group consisting of aliphatic alcohols, aliphatic amines, di-or tri-functional aliphatic alcohols, water miscible amides, acetamides, phosphates and lactones and mixtures thereof.

8. A process according to claim 1 wherein said polar cosolvent is selected from the group consisting of methanol, ethanol, propanol and isopropanol and mixtures thereof.

9. A process according to claim 1 wherein said polar cosolvent has a solubility parameter of at least 10 and is water miscible.

10. A process according to claim 1 wherein said organic liquid is selected from the group consisting of aromatic hydrocarbons, ketones, chlorinated aliphatic hydrocarbons, aliphatic hydrocarbons, cyclic aliphatic ethers, aliphatic ethers and organic aliphatic esters and mixtures thereof.

11. A process according to claim 1 wherein said organic liquid is selected from the group consisting of aliphatic hydrocarbons and aromatic hydrocarbons.

12. A process according to claim 1 wherein said organic liquid is selected from the group consisting of benzene, toluene, ethyl benzene, xylene and styrene and mixtures thereof.

13. A process according to claim 1, wherein said water is mixed with said fluid prior to injecting said fluid into said subterranean formation.

14. A process according to claim 1, wherein said water is contained with said subterranean formation prior to addition of said water to said solution.

* * * * *